April 17, 1962 C. PAOLINO, JR 3,030,478
CIRCUIT CONTROLLERS
Filed July 24, 1959

INVENTOR.
Charles Paolino Jr.
BY W. L. Stout
HIS ATTORNEY

United States Patent Office 3,030,478
Patented Apr. 17, 1962

3,030,478
CIRCUIT CONTROLLERS
Charles Paolino, Jr., Penn Hills Township, Allegheny County, Pa., assignor to Westinghouse Air Brake Company, Wilmerding, Pa., a corporation of Pennsylvania
Filed July 24, 1959, Ser. No. 829,246
5 Claims. (Cl. 200—153)

My invention relates to circuit controllers, and particularly to circuit controllers for assembly on a control panel as one of a compact group of similar units for controlling railway switches and signals or other apparatus.

In certain forms of railway signaling systems, the control of the switches and signals is effected by means of circuit controllers mounted on a central control panel. These circuit controllers are often of the miniature type in order to enable a large number of the circuit controllers to be mounted within convenient reach of the operator. Each position of the circuit controller generally corresponds to a different condition of the device controlled by the circuit controller. One form of circuit controller in systems of the type described includes a single cam which is rotatable by the associated operating knob to different positions corresponding to the different controller positions, and which is also axially movable by the knob between a biased position, in which the cam is prevented from being rotated, and an operated position, in which clockwise or counterclockwise rotation of the cam is permitted without further interference to its angular movement, to selectively operate contacts in accordance with the direction of rotation of the cam. The ease with which angular movement of the cam is permitted once it is moved to its operated position increases the possibility that the controlling position of the circuit controller, and the corresponding condition of the device controlled by the circuit controller, may be changed unintentionally should the cam be accidentally pushed inwardly to its operated position and a slight rotational force then simultaneously be applied to the operating knob.

One object, therefore, of my invention is to provide a circuit controller of the type described in which repositioning of the operating knob, when the operating knob is moved to its operated position, can not be achieved without the requirement of a more deliberate attempt on the part of the operator than heretofore has been customary.

Another object of my invention is to provide a circuit controller of the type described, which will not only have a compact, accessible, and reliable type of miniature construction but which at the same time may be constructed at a minimum cost.

A further object of my invention is the provision in a circuit controller having a cam axially movable between an inner position and an outer position and rotatable between two extreme angular positions for operating a plurality of initially biased contact springs, the bias of which is increased in response to angular movement of the cam, of latch means for preventing the cam from being returned from either of its extreme positions in response only to the increased biasing force of the springs.

Other objects and characteristic features of my invention will become apparent as the description proceeds.

In accordance with my invention, and to attain the aforementioned objects, the circuit controller comprises an operating knob secured to one end of an operating rod. The operating rod is slidably mounted for axial movement between a biased outer position and an inner position relative to a mounting panel. During initiation of a controlling movement, in which the operating rod is moved to its inner position, a cam secured to the other end of the operating rod becomes disengaged from latch means which are effective to latch the cam in any of its angular positions. The latch means act to prevent the cam from rotating from one position to another unless the operating knob is pushed to move the operating rod from its axially biased position, and also act to prevent rotation of the cam from any of its angular positions when the operating rod occupies its inner position, unless a further positive rotary force is applied to the operating knob for turning it.

I shall describe one form of relay embodying my invention, and shall then point out the novel features thereof in claims.

In the accompanying drawings.

Similar reference characters refer to similar parts in each of the several views.

Figure 1:
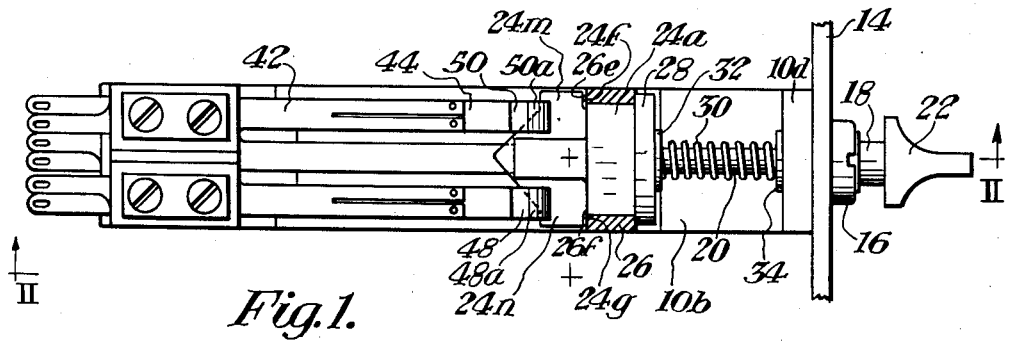
FIG. 1 is a plan view, partially in section, of a circuit controller in accordance with my invention.
Figure 2:
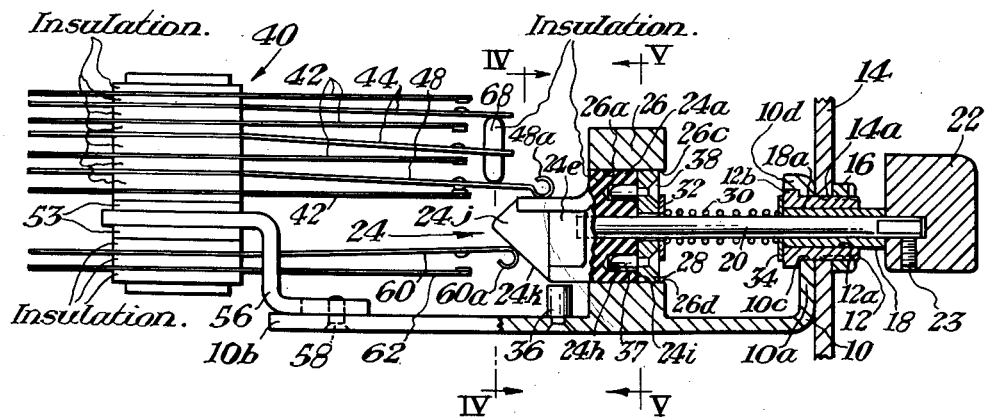
FIG. 2 is a side elevational view taken on the line II—II in FIG. 1 showing in detail one form of latch means embodying my invention.

Referring first to FIGS. 1 and 2, a circuit controller embodying my invention is here shown as comprising a supporting bracket 10 which in the particular form illustrated consists of a single strip of metal or other suitable material bent to form a vertical portion 10a and a horizontal portion 10b. The vertical portion 10a is provided with a clearance hole 10c and, at its upper end, with a rearwardly extending lip 10d. Extending through the hole 10c, and provided with a hole 12a in axial alignment with hole 10c, is a bushing 12 which further extends with clearance through a hole 14a formed in a mounting panel 14. The bushing is provided at one end on the outside of the mounting panel with a mounting nut 16 which engages the outer face of the panel. The other end of the bushing comprises a portion 12b of generally rectangular configuration, the upper surface of which abuts upon the flat under surface of the lip 10d to thereby prevent the bushing from turning when the controller is being secured to the mounting panel. A circular sleeve 18 provided externally with a bearing surface 18a is slidably mounted in hole 12a of the bushing 12 and projects slightly beyond the outer end of the bushing.

Extending completely through sleeve 18 is an operating rod 20, the outer end of which is provided with an operating knob 22, and the inner end of which is secured by any suitable means not shown to an operating cam of insulating material generally indicated 24 (FIG. 2). The operating knob 22 may be secured to the operating rod in any suitable manner but, as herein shown, it is secured by a set screw 23 screw-threaded into knob 22 and engaging the outer end of the operating rod. The cam 24 is provided at its one end closest to portion 10a of the bracket 10 with a rounded or circular portion 24a journaled in a bearing block 26 welded or otherwise secured to portion 10b of bracket 10. The bearing block 26 is provided at the end which receives the rounded portion 24a of the cam with a circular hole or well 26a, and is provided at its other end with a substantially rectangular hole 26b (FIG. 5) indicated at its upper and lower surfaces by the reference characters 26c and 26d, respectively. A latch plate 28 is loosely mounted on rod 20 and fits snugly in the hole 26b. By its engagement with surfaces 26c and 26d of the bearing block, the latch plate 28 is prevented from rotating. A biasing spring 30 surrounds operating rod 20 and is disposed under compression between a washer 32 in engagement with one side of latch plate 28 and a second washer 34 in engagement with a confronting side of the bushing 12.

Figures 3, 4, 5:
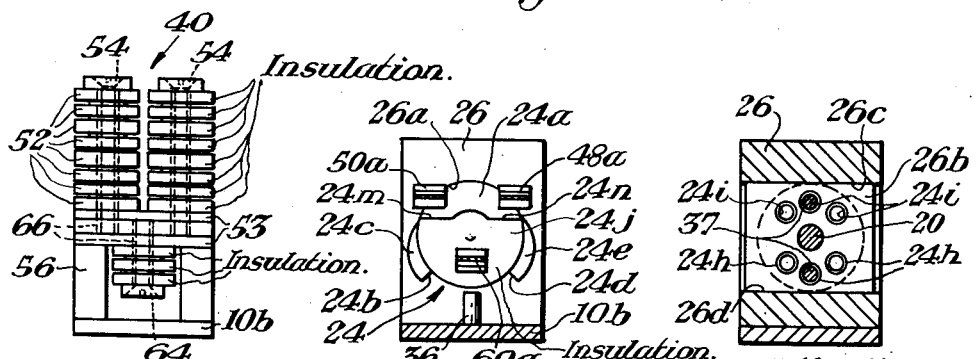
FIG. 3 is a detail view of the contact stack arrangement of the circuit controller shown in FIGS. 1 and 2.
FIG. 4 is a view taken substantially on the line IV—IV in FIG. 2, showing the operating cam in its intermediate position.
FIG. 5 is a view taken on line V—V in FIG. 2.

The cam 24 is intended to be rotated by operating knob 22 between an intermediate or central position, in which it is shown in the drawings, a counter-clockwise extreme position as viewed in FIG. 4 in which a stop surface 24b formed on one wing 24c of the cam engages a stationary stop pin 36 underlying the cam, and a clockwise extreme position in which a stop surface 24d formed on another wing 24e disposed opposite the wing 24c engages the stop pin 36. The cam 24 is also intended to be moved a predetermined distance axially inwardly by operating knob 22, in opposition to the bias of spring 30 from an outer position in which surfaces 24f and 24g (FIG. 1) of wings 24c and 24e, respectively, engage walls 26e and 26f, respectively, of the bearing block 26 to an inner position in which the operating knob 22 engages the outer end of bushing 12. It will be apparent that since spring 30 is initially placed under compression the latch plate 28 is biased by the spring into engagement with rounded portion 24a of the cam.

In accordance with my invention, the portion 24a of cam 24 confronting the latch plate is provided with three pairs of diametrically opposite holes 24h with adjacent holes at the upper and lower portions of the cam being spaced from each other by any suitable angular distance but, as herein shown, by 45 degrees. The holes 24h extend in a plane parallel to the longitudinal axis of the operating rod and are countersunk at 24i for a purpose which will be made clear as the specification proceeds. The cam holes are intended to cooperate with rounded pins or lugs 37 which extend outwardly from latch plate 28, the pins being riveted or otherwise secured to the latch plate. When cam 24 occupies its outer position, the pins 37 enter a pair of cam holes in accordance with the angular position of the cam, whereby the cam is latched in the position it then occupies. In the present embodiment of my invention, with the cam 24 occupying its outer position, the length of the portions of the pins which extend into the cam holes is greater than the distance that the cam travels from its outer to its inner axial position. That is, when the cam is moved inwardly to its inner axial position, the pins will not be completely withdrawn from the holes and the spherical heads of the pins will remain disposed within the countersunk portions of the holes. It follows, therefore, that in order to move the cam between its angular positions, once the cam has been moved to its inner position, it is first necessary to apply a turning force to the operating knob which is sufficient to move the sloped or chamfered edges of the cam holes upwardly over the ends of the pins until the heads of the pins are completely uncovered. When the surface of the cam between adjacent cam holes passes over the ends of the pins the latch plate 28 will be forcibly displaced from its engagement with portion 24a of the cam and spring 30 will thereby further be compressed, although slightly. In short, to permit the pins to be moved completely out of engagement with the cam holes, the biasing force of spring 30 must be overcome. When the cam is rotated from one to the other of its angular positions, and the operating knob is released, the spring 30, whose bias has increased, will act to automatically move the cam to its corresponding outer position to thereby latch it in this position.

Although it is obvious that the countersunk portion of the cam holes facilitates the entry of the pins into the holes, this arrangement possesses the advantage that not only must the force of the biasing spring be overcome but the frictional or sliding contact between the heads of the pins and the flared surface of the holes must also be overcome before the pins can be moved out of engagement with a pair of corresponding cam holes. Moreover, even though the depth of the countersink in the cam holes is relatively small, because of the miniature design of the related parts of the circuit controller, normal operation of the circuit controller by the operator will be accompanied by a definite manual sensation as the heads of the pins reach and fall away from the surface of the cam separating adjacent cam holes. Deliberate operation of the circuit controller is therefore required to insure that movement of the cam from one to another of its angular positions has fully been completed. Consequently, should the operating knob accidentally be pushed inwardly so that the cam then occupies its inner axial position, the cam will be prevented from rotating in the absence of a rotary force applied to the operating knob for turning it.

The circuit controller further comprises a contact stack generally indicated at 40. As best seen in FIG. 3, the contact stack includes two upper columns and a lower column, of contact springs. Each upper column includes fixed springs 42 and movable springs 44 and downwardly biased spring rods 48 and 50 one disposed in each column near its base. The contact springs and their associated spring rods are clamped between superposed insulating blocks 52 and spacers 53 secured by means of mounting screws 54 to the rearwardly projecting horizontal leg of a bracket 56, which bracket, in turn, is secured at its forwardly projecting leg by means of screws 58 to portion 10b of the supporting bracket 10. The lower column of springs is disposed intermediate the upper two columns and includes an upwardly biased spring rod 60 and a cooperating fixed spring 62 both similarly clamped between insulating blocks 52 by mounting screws 64 to the underside of the rearwardly projecting leg of bracket 56. Mounting screws 54 and 64 have the usual insulating sleeves 66 thereon, as best seen in FIG. 3. The outermost portion of spring rod 60 is provided with a return bend 60a which cooperates with cam 24 at a central curved portion 24j having a substantially conical cam face 24k (FIG. 2). When cam 24 occupies its outer position, the return bend 60a of spring rod 60 engages the cam face 24k and under these conditions the contact 60—62 is open. When, however, the cam 24 is pushed inwardly to its inner position, the return bend 60a then rides down the cam face 24k which forces spring rod 60 downwardly into engagement with spring 62 to thereby close the contact 60—62. The curved portion 24j of the cam has an annular length which is greater than the arc through which the operating knob can be rotated. It follows, therefore, that when the cam occupies its inner position, the contact 60—62 will be closed regardless of the angular position which the knob then occupies.

The spring rods 48 and 50 are provided at their outermost ends with return bends 48a and 50a, respectively, intended to cooperate with upper opposite flat surfaces 24m and 24n, respectively, of the curved portion of the cam. As best seen in FIG. 4, the return bends of spring rods 48 and 50 are spaced from the cooperating surfaces 24m and 24n of the cam when the cam occupies its inner intermediate position. A pair of operating ladders of suitable insulating material, only one of which 68 is shown in the drawings, cooperates with spring rods 48 and 50, respectively, in such a manner that when the cam is rotated to the counterclockwise position, hereinabove described, the surface 24n will engage the return bend 48a to lift spring rod 48, in opposition to its bias, and its associated operating ladder, to positions in which the movable springs 44 associated with one of the upper columns of springs will engage their associated fixed springs, and spring rod 48, as is obvious, will engage its associated front contact spring and become disengaged from its associated back contact spring. In a similar manner, when the cam is rotated to the clockwise position hereinabove described, the surface 24m of the cam will engage the return bend 50a of spring 50 and lift this spring rod, in opposition to its bias, and its associated operating ladder, to positions in which the movable springs 44 associated with the other one of the upper columns of springs will engage with their associated fixed springs, and spring rod 50, as is obvious, will engage its associated front contact spring and become disengaged from its associated back contact spring.

The contact springs operated during movement of the operating knob may be utilized to control any desired circuits in any suitable manner, and since these circuits form no part of my present invention they are not shown in the drawings.

When the operating knob is operated to move cam 24 to either its counterclockwise or clockwise extreme position, the restoring force of the movable springs and the increased biasing force of the spring rods tend to rotate the cam in a direction counter to the direction of knob rotation. This restoring force exerted by the movable springs becomes even greater as the number of the contact springs in the stack is increased. It will be appreciated, therefore, that if the operating knob is inadvertently pushed inwardly to a position in which the cam occupies its inner position, and no further rotary force is applied to the knob, the hereinabove described opposition to angular movement of the cam will nullify the effect of the restoring force of the contact springs and the biasing force of the spring rods and thus prevent the cam from leaving its extreme position. Under these conditions, the operating knob will automatically return to its corresponding outer position when the axially directed force is removed from the knob. The positions of the contact springs will, therefore, remain unchanged to prevent a possibly unsafe railway switch movement which otherwise might be the case if the pins were completely withdrawn from the cam holes.

By extending the lengths of the pins 37, I have provided, as a particular feature of my invention, a circuit controller in which a biasing spring functions simultaneously to bias the operating knob to its outer position and to prevent the knob from rotating if it is accidentally pushed forward. Two distinct motions are therefore required to move the knob from any one to the other of its angular positions. The present arrangement also affords the use of a contact stack having a large number of contact springs by overcoming the effect of the restoring force of the springs when the springs are actuated from their normal positions.

Although I have herein shown and described one form of circuit controller embodying my invention, it is understood that various changes and modifications may be made therein within the scope of the appended claims without departing from the spirit and scope of my invention.

Having thus described my invention, what I claim is:

1. A circuit controller comprising a supporting bracket, an operating rod mounted for longitudinal movement between first and second axial positions and rotary movement between at least two angular positions relative to said bracket, means for moving said operating rod, spring means surrounding said rod for biasing said rod to its first axial position, a bearing block fixed with respect to said rod and which aligns with the axis of rotation of said rod, said rod projecting through said block and being freely rotatable with respect thereto, said block provided at its one side adjacent to said spring with a noncircular hole and provided at the opposite side with a substantially circular hole, a cam journaled in said circular hole and secured to said rod for movement therewith, latch means disposed in the noncircular hole in said block and cooperating with said cam for preventing rotation of said cam from its one to its other angular position unless said cam is first moved to its second axial position, a first contact actuated in response to rotary movement of said cam to its one angular position, and a second contact actuated in response to rotary movement of said cam to the other one of its angular positions.

2. A multi-position circuit controller comprising a supporting bracket, an operating rod mounted for longitudinal movement between an inner position and an outer position and for rotary movement between an intermediate and two extreme positions relative to said bracket, spring means for biasing said rod to its outer position, means connected with said rod for moving it, a cam mounted on said rod and movable longitudinally and rotatably therewith, said cam provided with countersunk holes extending in a plane parallel to the longitudinal axis of said rod, a latch plate having pins engaging said holes when said rod occupies its outer position whereby said rod can not be rotated unless it occupies its inner position, said holes and said pins being proportioned relative to each other such that when said rod is moved to its inner position the pins project slightly into the holes thereby necessitating that the rotary force applied to said rod for turning it be sufficient to forcibly move the heads of said pins upwardly over the countersunk portions of said holes, and contacts actuated by said cam in accordance with its extreme position.

3. A plural position circuit controller comprising a cam movable axially a predetermined distance between an outer position and an inner position and rotatable between an intermediate and two extreme angular positions, an operating rod connected with said cam for moving it, a spring on said rod for biasing said cam to its outer position, a latch plate loosely mounted on said rod and located between said spring and said cam and biased by said spring into engagement with a confronting side of said cam, said cam having in the side confronting said latch plate a plurality of pairs of countersunk holes each extending in a plane parallel to the longitudinal axis of said operating rod, a pair of pins on said latch plate cooperating with one pair of said holes in accordance with the angular position of said cam, said pins projecting sufficiently into the holes when said cam occupies its outer position to prevent angular movement of said cam, the length of the portions of the pins projecting into said holes when said cam occupies its outer position being slightly greater than the predetermined distance of said cam axial movement so that when said cam is moved to its inner position said pins project slightly into said holes, whereby angular movement of said cam is permitted only by exerting a rotary force on said cam great enough to move the heads of said pins over the countersunk portions of said holes, and first and second contacts actuated in response to angular movement of said cam to one and to the other of its extreme angular positions.

4. A circuit controller comprising a supporting bracket, a bearing block mounted on said supporting bracket and provided in one side thereof with a noncircular hole and in the opposite side with a circular hole, an operating rod whose axis of rotation aligns with said circular hole extending from said one side to said opposite side of said block, a cam secured to said rod and journaled in said circular hole, said operating rod being movable axially between an inner position and an outer position and rotatable between an intermediate and two extreme rotated positions, an operating member secured to said operating rod at the end opposite to said cam for moving it, a caged spring surrounding said rod and biasing it to its outer position, a latch plate loosely mounted on said rod and disposed in the noncircular hole in said block and being biased by said spring into engagement with said block, means on said latch plate cooperating with said cam for preventing rotation of said cam unless said rod is first moved from its outer to its inner position, and electrical contacts selectively actuated by said cam in accordance with the angular position of said operating rod.

5. A circuit controller comprising a cam movable axially between a first position and a second position and rotatable between an intermediate and two extreme angular positions, an operating rod connected with said cam for moving it, a spring on said rod between said cam and said operating member for biasing said cam to its first position, a latch plate loosely mounted on said rod between said spring and said cam and biased by said spring into engagement with a confronting side of said cam, said cam having in the side confronting said latch plate a plurality of pairs of diametrically opposite holes extending in a plane parallel to the longitudinal axis of said rod, a pair of pins on said latch plate engaging one pair of said holes in accordance with the angular position of said cam, said pins projecting sufficiently into the holes when said cam occupies its first position to prevent angular movement of said cam but projecting only slightly into said holes when said cam occupies its second position such that angular movement of the cam is permitted only by exerting a rotary force on the operating rod sufficient to force the heads of the pins outwardly from the holes and onto the surface of the cam between adjacent holes, and contacts actuated by said cam in accordance with the angular position of the cam.

References Cited in the file of this patent

UNITED STATES PATENTS

| | | |
|---|---|---|
| 2,445,820 | Bloomberg et al. | July 27, 1948 |
| 2,545,172 | Sensinger | May 13, 1951 |
| 2,695,339 | Williams | Nov. 23, 1954 |
| 2,748,204 | Woods et al. | May 29, 1956 |
| 2,816,977 | De Kramer | Dec. 17, 1957 |